Figure 1:
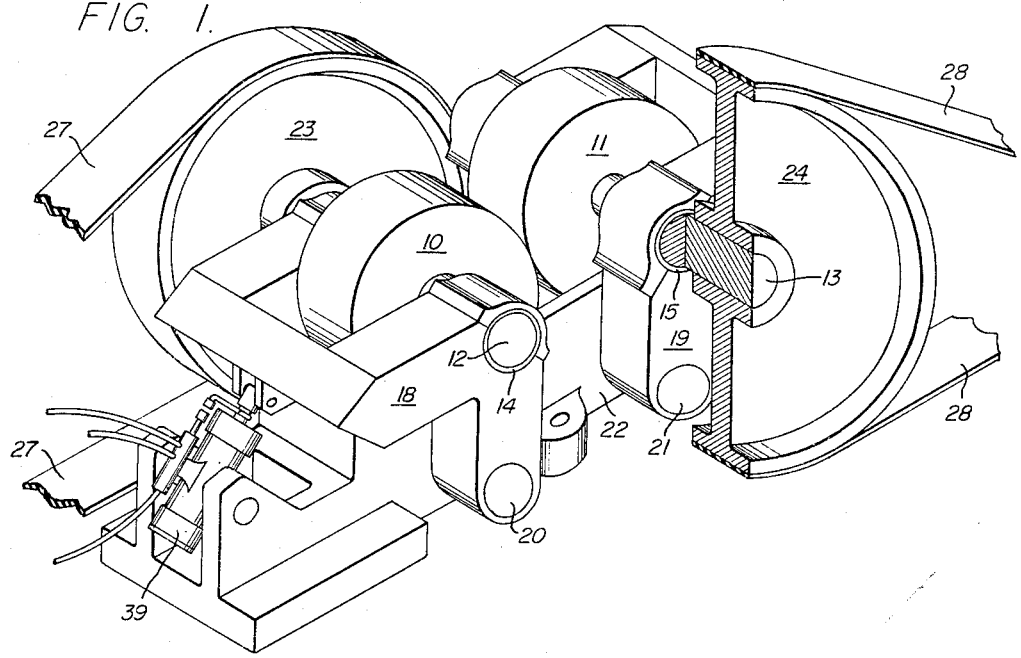

Sept. 28, 1965    H. H. PICK ETAL    3,208,678
DUAL-PIVOTING, CRADLE TYPE, ROLL CRUSHER
Filed March 8, 1963    4 Sheets-Sheet 1

INVENTOR.
HANS H. PICK
NORMAN STANLEY

BY Mallinckrodt and Mallinckrodt
ATTORNEYS

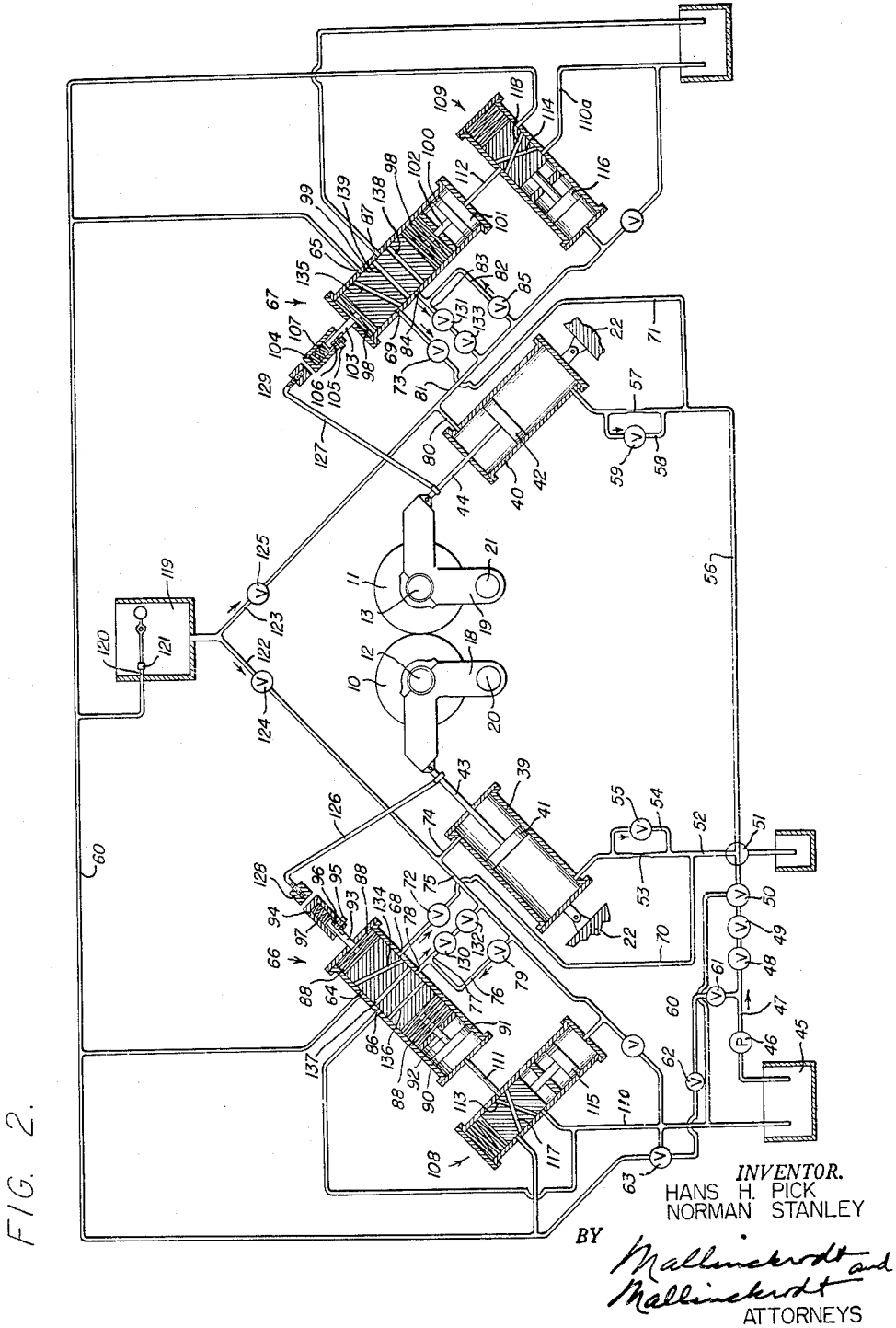

INVENTOR.
HANS H. PICK
NORMAN STANLEY
BY Mallinckrodt and Mallinckrodt
ATTORNEYS Sept. 28, 1965   H. H. PICK ETAL   3,208,678
DUAL-PIVOTING, CRADLE TYPE, ROLL CRUSHER
Filed March 8, 1963   4 Sheets-Sheet 4

FIG. 5.

INVENTOR.
HANS H. PICK
NORMAN STANLEY
BY *Mallinckrodt and Mallinckrodt*
ATTORNEYS United States Patent Office 3,208,678
Patented Sept. 28, 1965

3,208,678
DUAL-PIVOTING, CRADLE TYPE, ROLL CRUSHER
Hans H. Pick and Norman Stanley, Salt Lake City, Utah, assignors to Kennecott Copper Corporation, New York, N.Y., a corporation of New York
Filed Mar. 8, 1963, Ser. No. 263,791
7 Claims. (Cl. 241—231)

This invention relates to crushers for use in roll type crushing operations wherein it is desirable to maintain a constant crushing pressure between opposing rolls and to extend normal equipment life by reducing the detrimental forces occuring at roll bearings during crushing operations.

It has long been conventional to provide springs in roll crushers to bias one or more movable rolls against or to within a desired distance of a fixed roll, thereby allowing the movable roll to yield whenever unusually large or otherwise uncrushable materials are introduced into the crusher. This arrangement of structure serves to reduce, somewhat, the stresses that are created in the machinery and lowers the frequency with which roll shafts bend and crusher frames break. To this extent it is very useful. However, the reaction stresses developed in the fixed bearings of such an arrangement are not reduced, and these forces are still transmitted through the fixed bearings to the crusher frame.

To reduce the reaction forces transmitted through all bearings it has been proposed to mount both rolls of a two roll crusher on resiliently biased supporting structures such that the biasing means will absorb part of the reaction forces normally developed in the bearings of both rolls during crushing operations.

Springs have been most commonly used in the past as biasing means, but they are subject to fatigue and are inadequate to maintain a constant crushing pressure over long periods of use. Furthermore, springs normally do not provide a constant pressure. As roll surfaces wear away, springs expand, and, as uncrushable objects pass between the rolls, they contract, with resultant changes in the spring rates. Springs also create additional stress forces which damage the machinery. For example, after an uncrushable object passes between spring biased rolls, they may slam together under the expanding influence of the biasing springs. This impact will damage the surfaces of the rolls and create shock forces throughout the roll crusher assembly, thereby necessitating the use of larger and stronger crusher components than would be required in the absence of such shock forces. Even in roll crushing machines utilizing shims to prevent the rolls contacting each other, the shock forces created by spring biased rolls slamming against immovable structure are still present.

It is a primary object of the present invention to provide a practical roll type crusher in which both of a pair of crushing rolls are yieldably urged to crushing position without the use of springs, so that the biasing force is constant at all times and strain on the bearings is minimized.

Other objects are to provide biasing means that will absorb many of the reaction forces created by crushing operations, that will automatically compensate for wear of the crushing surfaces, will prevent the crushing rolls slamming back together after opening, and will allow centering of the rolls to insure a constant plane of crushing, thereby facilitating feed operations to the crusher.

Features of the invention in the achievement of these objects include the provision of a pair of crushing rolls journaled for rotation in bearings of pivoted cradles. The pivoted cradles are biased to crushing position by a pair of hydraulic motors actuated by a unique hydraulic control circuit. Control valves in the hydraulic circuit are actuated by manually positioned, micrometer adjustment screws, to center the rolls regardless of the wear thereon and to thereby provide a crushing plane having a fixed vertical position. Additionally, the hydraulic circuit includes means to insure a constant pre-set crushing pressure regardless of roll surface wear, as well as means to prevent the rolls from slamming together after opening.

There is shown in the accompanying drawings specific embodiments of the invention representing what are presently regarded as the best modes of carrying out the generic concepts in actual practice. From the detailed description of these presently preferred forms of the invention, other more specific objects and features will become apparent.

Figure 3:
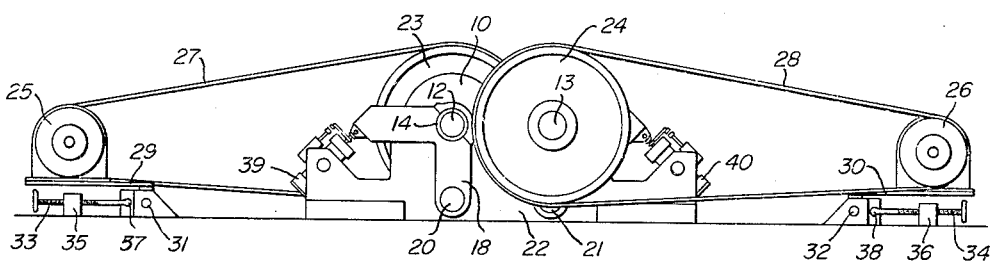
Figure 4:
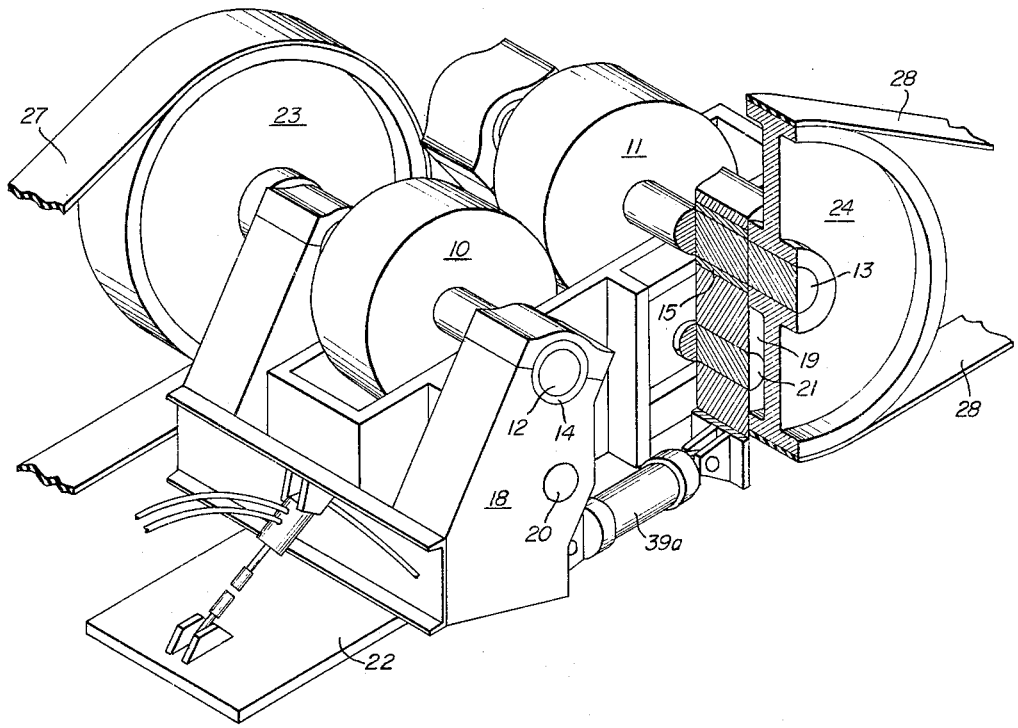
Figure 6:
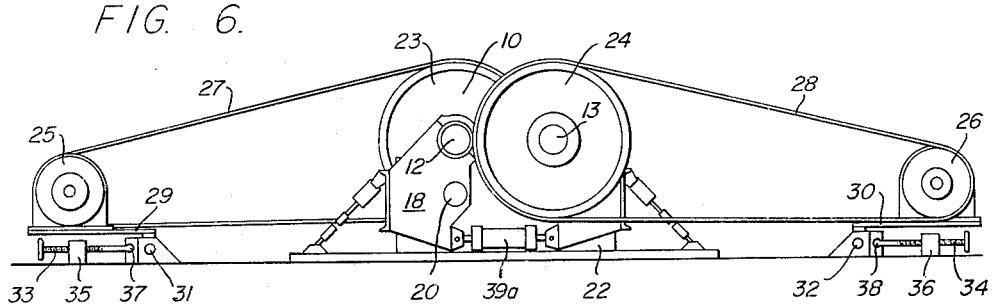

In the drawings:

FIG. 1 is a fragmentary isometric view of one embodiment of roll type crusher conforming to the invention;

FIG. 2, a schematic showing of the hydraulic circuit used with the machine of FIG. 1, the crusher and the pivoting motors therefor being drawn to a much smaller scale than the hydraulic circuit structure;

FIG. 3, a side elevation of the machine of FIG. 1 and the electric motor drive means therefor drawn to a reduced scale;

FIG. 4, a fragmentary isometric view of another embodiment of the crusher;

FIG. 5, a schematic showing of the hydraulic circuit used with the machine of FIG. 4 and again with the crusher and pivoting motors therefor drawn to a smaller scale than the hydraulic circuit structure; and FIG. 6, a view similar to FIG. 3, showing the machine of FIG. 4.

Referring now to the drawings:

In the constructions shown, a pair of crushing rolls 10 and 11 are rigidly mounted on shafts 12 and 13. The shafts are journaled for rotation in bearings 14 and 15 of pivoted roll cradles 18 and 19 and the cradles, mounted by means of pivots 20 and 21 on the crusher base 22, are rotated by actuation of hydraulic motors in a manner to be described.

Drive pulleys 23 and 24 are also fixed to shafts 12 and 13. These are rotated by individual electric motors 25 and 26 through V-belts 27 and 28, seen best in FIGS. 3 and 6.

To maintain a constant drive of the rolls, the same tension must be maintained on the V-belts at all times, regardless of the position of the rolls. This may be accomplished, for example, by mounting the motors on platforms 29 and 30, above fulcrums 31 and 32, so that the weight of the motors and the distance from the fulcrums to the center of gravity of the motors will determine the tension on the belts. Rotation of the roll cradles about their pivot points will result in similar movements of the motors and platforms about their fulcrums, thereby maintaining the tension.

Tension on the belts can be varied merely by turning threaded rods 33 and 34 within fixed supports 35 and 36, to laterally move the fulcrums connected to the rods by ball joints 37 and 38.

In the embodiment shown in FIGS. 1–3 the hydraulic motors 39 and 40, comprise cylinders pivotally fixed to the crusher base 22, pistons 41 and 42 (see FIG. 2), and piston rods 43 and 44 pivotally connected to the cradles, as shown, and are actuated through the hydraulic control circuit illustrated schematically in FIG. 2.

In order to maintain a substantially constant crushing pressure, it is necessary that during all conditions of operation the difference in pressures acting on the front and rear faces of each of the pistons 41 and 42 be maintained the same.

Fluid pressure is supplied to the chamber behind each piston from a reservoir 45 by way of pump 46, conduit 47, check valve 48, pressure regulator 49, relief valve 50, manually operable control valve 51, and conduit 52 (which has a restrictor 53 with by-pass 54 and check valve 55 therein) to the rear of motor 39, or by way of conduit 56, with restrictor 57, by-pass 58 and check valve 59 therein, to the rear of motor 40.

The regulator 49 and relief valve 50 will maintain a constant pressure downstream of the regulator, and their settings will determine the high pressure applied at the rear of each of the pistons 41 and 42.

Valve 51 has alternate positions, wherein liquid is either supplied through conduits 47 to conduits 52 and 56, or is exhausted from conduits 47, 52 and 56 to drain. When in the latter position, the rear chamber in each of the hydraulic motors is exhausted for a purpose to be further explained.

Conduit 60, having check valve 61, pressure regulator 62, and relief valve 63 therein, connects the outlet of pump 46 with ports 64 and 65 of automatic control valves 66 and 67. These ports are spaced opposite ports 68, 69, respectively, which lead into conduits 70 and 71 intersecting conduits 52 and 56 between their respective restrictors and relief valve 50. Pressure regulator 62 and relief valve 63 are set to maintain a desired, constant, high pressure downstream thereof, which pressure is utilized for centering the crushing rolls and for wear compensation, as will become apparent.

Check valves 72 and 73 prevent flow from conduits 52 and 56 to the control valves through conduits 70 and 71.

The front chamber of motor 39 is connected, via conduits 74, 75, 76, and 77, to port 78 of control valve 66. Check valve 79 prevents flow through line 76 to the motor chamber.

Similarly, the front chamber of motor 40 is connected, via conduits 80, 81, 82, and 83, to port 84 of control valve 67, and check valve 85 prevents flow through conduit 82 to the motor chamber.

Positioned opposite the ports 78 and 84 in valves 66 and 67 are ports 86 and 87 connected to drain discharge conduits.

Springs 88 at each end of spool element 89 of valve 66 bias it to centered position, and piston 90 in housing 91 is connected to the spool element by stem 92 which extends between the valve and piston housings. Fixed to the other end of the spool element and extending through the valve housing is a rod 93, the free end of which is capped by spring retainer 94. Set screw 95 extends into and reciprocates in slot 96 formed in the rod, and a spring 97, of much greater strength than the springs 88, is positioned between the end of the rod and the spring retainer.

Valve 67 is of identical configuration, with centering springs 98, spool element 99, a piston 100 in housing 101 connected to the spool element by a stem 102, a rod 103, spring retainer 104 held in place by set screw 105 for reciprocation in slot 106, and a spring 107 between the rod and the spring retainer. Valves 66 and 67 are conveniently positioned on the cylinders of motors 39 and 40, as shown in FIGS. 1, 3, 4 and 6.

Pilot valves 108 and 109 are provided to regulate supply and exhaust of pressure fluid to the piston housing 91 and 101. These are normally spring biased to connect the housings with exhaust line 110 and 110a through supply and exhaust conduits 111 and 112 and passages 113 and 114. However, as will be further explained, whenever the pressure in the front motor chambers is sufficient to act on pistons 115 and 116 to overcome the biasing of their springs, the valves are moved to a position wherein high pressure fluid is supplied from conduit 60 through passages 117 and 118 and through supply and exhaust conduits 111 and 112 to the piston housings.

To prevent a vacuum forming in the front chamber of each motor as the pistons 41 and 42 are moved back, a makeup supply means is utilized. This includes a reservoir 119, having inlet 120 connected to conduit 60, and a liquid-level-responsive control valve 121 which will maintain a substantially constant head of liquid in the reservoir. Gravity feed outlet lines 122 and 123 lead to the front chambers of motors 39 and 40, and a spring biased closed check valve is positioned in each line, as shown at 124 and 125. These valves will open only when a predetermined pressure differential exists at their opposite faces, or in other words, when the pistons are being moved back, thereby creating a lower than normal pressure in the front motor chambers.

To insure centering of the vertical crushing plane between the rolls, rigid valve-contacting means are provided to move with each roll, and are made adjustable to vary the time at which the corresponding automatic control valve is contacted. These contacting means include threaded rods 126 and 127 rigidly fixed for movement with piston rods 43 and 44 and having interiorly threaded caps 128 and 129 screwed on the end. Screwing the caps on or off will vary the effective length of the rods and the distance the pistons 41 and 42 will move within their housings.

The pressure maintained in the front chambers of the motors is determined by the setting of pressure regulators 130, 131 (positioned in conduits 77 and 83, which by-pass conduits 76 and 82) and by the setting of relief valves 132 and 133.

In operation, manual control valve 51 is first positioned to exhaust liquid from the rear chambers of motors 39 and 40, as previously described, and the pressure regulators 130, 131 are set to maintain a higher than normal pressure in conduits 77 and 83. It should be noted that when the spool elements 89 and 99 are centered under the influence of springs 88 and 98, there is no communication through the valves 66 and 67. However, the existing liquid in the front motor chambers and the closed hydraulic circuit connected thereto will create a sufficient pressure to initiate movement of pistons 41, 42 to the rear of their cylinders when the pressure behind the pistons is relieved. As the pistons begin to move, supplemental liquid will be supplied the front motor chambers from reservoir 119, as previously described.

Movement of the pistons to the rear of their cylinders will pivot each cradle and crushing roll set away from the other about pivots 20 and 21. This results in caps 128 and 129 (fixed to the piston rods and movable therewith) making contact with spring retainers 94 and 104. Continued pivoting will result in rearward movement of spool elements 89 and 99 and compression of the weak centering springs 88 and 98 at the rear of the valve housings.

When the spool elements 89 and 99 have reached their rearmost position, communication is established between ports 64 and 78 of valve 39 and between ports 65 and 84 of valve 40, via passages 134 and 135 in the spool elements. Liquid passes through these valves and through pressure regulators 130 and 131 to the front motor chambers. Since the regulators 130 and 131 have been set to allow a higher than normal pressure in the front chambers, and since this pressure acts through conduits 74, 75 and 80, 81 on pistons 115 and 116, pilot valves 108 and 109 are actuated to allow high pressure liquid from conduit 60 through passages 117 and 118 to piston housings 91 and 101.

The liquid build-up in piston housings 91 and 101 will create sufficient pressure on pistons 90 and 100 to move them and their associated spool elements to the other end of their housings, compressing the relatively strong springs 97 and 107. When the valves are in this new position, the high pressure in the front motor of motor 39 is reduced through conduits 74, 75, 76, check valve 79, conduit 77 and the passage 136 in the spool element 89. At the same time, high pressure liquid from conduit 60 flows through passage 137 to conduit 70 to supplement liquid being applied to the rear motor chamber through conduit 52. Similarly, the pressure in the front chamber of motor 40 is reduced through conduits 80, 81, 82, check valve 85, conduit 83, and passage 138 through spool element 99. Supplementary high pressure liquid is supplied to the rear motor chamber from conduit 60 through passage 139 in the spool element, and conduit 71 leading to conduit 56, through which liquid is supplied to the motor.

The pressure regulators 130 and 131 are set to maintain the desired front motor chamber pressure, and the pressure therein is reduced to that level in the manner described above. As the desired pressure is achieved, the pilot valves 108, 109 are spring biased to a position wherein the liquid previously applied to the piston housings 91 and 101 is exhausted.

Manual valve 51 is positioned to supply liquid to the rear motor chambers and the pistons are moved forward. As the pistons move, the valve-contacting means carried by their piston rods are also moved forward, thus releasing the spool elements 89 and 99. The centering springs 88 and 98 then act to center them.

The pistons will continue to move forward as a result of the pressure differential thereacross until the crushing rolls are in crushing position and the forces acting thereon are balanced. Because the pressure differential in each of the identical motors is the same, the pistons, and consequently the crushing rolls, will move at the same speed and will meet mid-way between them. At this time, the rolls are ready for crushing operation and the crushing force will be dependent on the pressures established at the front and rear of the pistons 41 and 42. It will be apparent that the crushing force can be easily varied merely by changing the settings of pressure regulators 49, 62, 130, and 131 and their cooperating relief valves 50, 63, 132, and 133.

As the surfaces of the crushing rolls wear away, the pressure behind pistons 41 and 42 will force them forward. This will increase the pressure in the front motor chambers, but only until the pilot valves 108 and 109 are actuated to again reduce excess presure in the front chambers and allow a supplemental source to be applied to the rear chamber, thereby re-establishing the pre-set pressure differential in the manner previously explained. When this differential has been re-established the spool elements will again be centered by their springs. In this operation, wear compensation has been automatically performed and the crushing force has been maintained substantially constant.

Should the rolls be forced apart, as by an uncrushable object passing therebetween, the pistons 41 and 42 will be forced back. This will cause an increased pressure in lines 52, 56, and 47, but such pressure will be relieved through relief valve 50. At the same time, any substantial low pressure created in the front motor chambers will cause check valves 124 and 125 to open and allow make-up liquid to flow from reservoir 119 to the motors, thereby maintaining the pre-set pressure differential.

Since high pressure can only be supplied to the rear motor chambers through restrictors 53 and 57 and since forward motion of the pistons is slowed by the previously described process of reducing pressure in the front motor chambers, the rolls cannot "slam" together after being forced apart and large impact forces are avoided.

The modification shown in FIGS. 4–6 is very similar to that above described. Accordingly, the same reference numerals are applied to identical structure; only different or newly added structure are identified by new reference numerals. Since the overall construction is so similar to the embodiment of FIGS. 1–3, it is believed that the following description of operation will adequately describe the present embodiment.

In this construction hydraulic motors 39a and 40a are positioned between cradles 18 and 19 to pivot them about pivots 20 and 21.

Motor 39a has a piston 41a therein, which is pivotally connected to cradle 18 through piston rod 43a, and another piston 42a similarly connected to cradle 19 through piston rod 44a. Spaced stops, which may take the form of rings 39b, are provided to prevent the pistons 41a and 42a moving into abutting relationship.

Motor 40a is of identical construction, with a piston 41b pivotally connected to cradle 18 through piston rod 43a, and with a piston 42b similarly connected to cradle 19 through piston rod 44b. Spaced stops 40b are provided for the same purpose as are the stops 39b.

High pressure liquid is supplied to the chambers between the spaced stops and behind each of the pistons by way of conduits 52 and 52a, and low pressure is supplied the motor chambers in front of the pistons by way of conduits 74, 74a and 80, 80a in a manner to be described. The pressure differential on opposite sides of each piston is maintaned the same, and, as in the previous embodiment, the established pressure differential will determine crushing pressure of the rolls.

In operation, manual control valve 51, FIG. 5, is positioned to exhaust liquid from the motor chambers between the pistons, and to by-pass (to header 140 and to a drain discharge conduit 140a, as shown) liquid normally supplied the motors by way of conduit 52. Pressure in front of the pistons will move them back until they contact the stops 39b or 40b, thereby pivoting cradle 18 and its roll 10, and cradle 19 and its roll 11, away from each other.

Valves 66 and 67 are fixed on their respective cradles 18 and 19 for movement therewith, so that, as the cradles are pivoted away from each other, the spring retainers 94 and 104 come in contact with threaded caps 128, 129 on rods 126 and 127 fixed to the crusher base. This compresses the rear springs 88 and 98 and positions the spool elements to allow high pressure fluid to pass through the diagonal passages in the valves to lines 74, 74a, and 80 and 80a and the front of each piston.

Pressure in the chambers in front of each piston is controlled by the regulators 130, 131, as in the previous embodiment, the spool elements being moved to the other ends of their housings when pilot valves 108 and 109 are operated, all in the manner previously described.

After the pressure in the chambers in front of the pistons has been set, the manual valve 51 is positioned to allow high pressure liquid to pass from conduit 52 to the chambers between the pistons. This will establish a higher pressure behind each piston than is present in the front chambers and the pistons will be moved forwardly, thereby pivoting the cradles towards each other and the rolls into crushing engagement.

As in the previous embodiment, a substantially constant crushing pressure is maintained at all times and compensation is automatically made for wear of crushing surfaces.

Thus, as the surfaces of the rolls wear away the pistons in each cylinder are moved away from each other, thereby pivoting the cradles and rolls together. The pressure between the pistons remains constant, as determined by the pressure regulator 49 and associated relief valve 50. The pressure at the front of each piston will increase somewhat, but only until pilot valves 108 and 109 are actuated, with a resultant movement of the spool elements of valves 66 and 67 to re-establish the desired pressure differential, in the manner previously described.

When a large or otherwise uncrushable object passes between the rolls, the pistons of each cylinder are forced together, thereby increasing the pressure between them slightly until relief valve 50 opens to relieve the excess pressure therefrom. At the same time, the low pressure created at the front of the pistons as they are moved back will result in an opening of check valves 124 and 125 to supply make-up liquid from reservoir 119, thus increasing the pressure at the front of the pistons to the predetermined figure. The rolls are prevented from slamming back together, because restrictor 53 prevents rapid flow of high pressure fluid to the chambers between pistons and because there is an inherent delay in exhausting liquid from in front of the pistons through valves 66 and 67 in the manner previously described.

In both embodiments, means are provided to establish and maintain a constant crushing pressure, to compensate for wear on roll surfaces, and to reduce bearing stresses, thereby permitting use of anti-friction bearings, rather than the large babbit bearings commonly used and a decrease in the size and strength of roll-supporting structure required.

Whereas there is here illustrated and specifically described a certain preferred construction of apparatus which is presently regarded as the best mode of carrying out the invention, it should be understood that various changes may be made and other constructions adopted without departing from the inventive subject matter particularly pointed out and claimed herebelow.

We claim:

1. A dual-pivoting, cradle type, roll crusher, comprising a base; a pair of cradles pivotally mounted on said base for movement toward and away from each other; a pair of crushing rolls, said rolls being fixed to respective shafts journaled for rotation, one in each of said cradles, and being in cooperative crushing engagement when said cradles are pivoted toward each other; drive means for rotating each of said rolls with respect to the other; means for rotating said cradles about their respective pivot connections with the base; means to vary the crushing pressure exerted by the rolls; and means to compensate for wear on the crushing faces of the rolls while maintaining a substantially constant crushing pressure regardless of the size of material passing between the rolls.

2. The roll crusher of claim 1, wherein means are provided to prevent said rolls, rapidly slamming together after they have been moved apart by the material passing between them.

3. The roll crusher of claim 2, wherein means are provided to insure centering the crushing plane of said rolls mid-way between their shafts.

4. A dual-pivoting, cradle type, roll crusher, comprising a base; a pair of cradles pivotally mounted on said base for movement toward and away from each other; a pair of crushing rolls, said rolls including axle shafts journaled for rotation in the respective cradles; drive means for rotating each of said rolls with respect to the other, including drive pulleys fixed to the resective axle shafts, drive motors for the respective pulleys, drive belts interconnecting said pulleys and said motors, and adjustable fulcrums, said motors being mounted above said fulcrums such that the weight of the motors will maintain a substantially constant tension on the drive belts during all positions of rotation of said cradles.

5. The roll crusher of claim 4, wherein the fulcrums are adjustable longitudinally between the rolls and the centers of gravity of the motors positioned thereabove, to vary the tension maintained on the drive belts.

6. A dual pivoting, cradle type, roll crusher, comprising a base; a pair of cradles pivotally mounted on said base for movement toward and away from each other; a pair of crushing rolls, each including an axle shaft journaled for rotation on one of said cradles; and hydraulic means for rotating said cradles about their respective pivot connections with the base, said hydraulic means including means for varying the crushing pressure exerted by the rolls, means for compensating for wear on the crushing faces of the rolls while maintaining a substantially constant crushing pressure, means to prevent said rolls slamming together, means to insure centering of the crushing plane of said rolls mid-way between their shafts, and a pair of hydraulic motors, each including a housing, a piston in said housing, and a piston rod fixed to the piston and extending through one end of the housing, the free end of each of said rods being pivotally connected to a cradle and the cradles and the rolls carried thereby being positioned between said motors.

7. A dual pivoting, cradle type, roll crusher, comprising a base; a pair of cradles pivotally mounted on said base for movement toward and away from each other; a pair of crushing rolls, each including an axle shaft journaled for rotation on one of said cradles; and hydraulic means for rotating said cradles about their respective pivot connections with the base, said hydraulic means including means for varying the crushing pressure exerted by the rolls, means for compensating for wear on the crushing faces of the rolls while maintaining a substantially constant crushiing pressure, means to prevent said rolls slamming together, means to insure centering of the crushing plane of said rolls mid-way between their shafts, and a pair of hydraulic motors, each including a housing positioned between the cradles, a pair of pistons in said housing, and a pair of piston rods, one of said rods being fixed to one of said pistons, extending through said housing and being pivotally connected to one of said cradles, and the other of said rods being fixed to the other of said pistons, extending through said housing and being pivotally connected to the other of said cradles.

References Cited by the Examiner

UNITED STATES PATENTS

| | | | |
|---|---|---|---|
| 1,539,948 | 6/25 | McGregor | 241—230 |
| 3,010,663 | 11/61 | Bosshard | 241—231 |
| 3,066,876 | 12/62 | Verdier | 241—230 |
| 3,099,406 | 7/63 | Kautz | 241—231 |

ANDREW R. JUHASZ, *Primary Examiner.*

J. SPENCER OVERHOLSER, *Examiner.*